United States Patent
Milton

(10) Patent No.: US 7,524,426 B2
(45) Date of Patent: Apr. 28, 2009

(54) CYCLONIC PARTICLE SEPARATOR FOR FUEL SYSTEMS

(75) Inventor: Jeffery John Milton, Macomb, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 0 days.

(21) Appl. No.: 11/822,787

(22) Filed: Jul. 10, 2007

(65) Prior Publication Data

US 2008/0011692 A1    Jan. 17, 2008

Related U.S. Application Data

(60) Provisional application No. 60/830,815, filed on Jul. 14, 2006.

(51) Int. Cl.
*B01D 21/26* (2006.01)
*B01D 17/038* (2006.01)

(52) U.S. Cl. .................. 210/788; 210/787; 210/512.1; 209/724; 209/727

(58) Field of Classification Search .............. 210/512.1, 210/788, 787; 209/723, 724, 727
See application file for complete search history.

(56) References Cited

U.S. PATENT DOCUMENTS

| 801,806 | A |  | 10/1905 | Miller |
| 2,573,192 | A |  | 10/1951 | Fontein |
| 3,501,014 | A | * | 3/1970 | Fitch, Jr. et al. .......... 210/512.1 |
| 4,389,307 | A |  | 6/1983 | Boadway |
| 5,429,250 | A |  | 7/1995 | Dobson |
| 2005/0218088 | A1 |  | 10/2005 | Gonzales et al. |

FOREIGN PATENT DOCUMENTS

DE    103 53 367 A1    6/2005

* cited by examiner

*Primary Examiner*—David A Reifsnyder

(57) ABSTRACT

A cyclonic separator (10) separates contaminants from liquid fuel. The separator includes a body (12) having a base portion (14) and sidewall structure (16) extending from the base portion. The base portion and sidewall structure define an internal volume (V). An inlet port (18) in the body communicates with the internal volume, and an outlet port (20) in the body also communicates with the internal volume. The sidewall structure is constructed and arranged to cause fuel, containing a mixture of liquid fuel and contaminants, that enters the inlet port, to move in a generally circular manner in the internal volume so that the contaminants (P) separate from the liquid fuel, with the contaminants settling in the base portion and the liquid fuel (F') moving through the outlet port.

20 Claims, 1 Drawing Sheet

CYCLONIC PARTICLE SEPARATOR FOR FUEL SYSTEMS

This application claims the benefit of the earlier filing date of U.S. Provisional Application No. 60/830,815, filed on Jul. 14, 2006, which is incorporated by reference herein in its entirety.

FIELD OF THE INVENTION

This invention relates to separating solid particles from fuel and, more particularly to a cyclonic particle separator for vehicle fuel systems.

BACKGROUND OF THE INVENTION

Current automotive fuel systems rely on paper filters to remove contaminants. Due to the desire for increased lifetime and dirt holding capacity of these filters, the size of the filter has grown exponentially, from older models that needed to trap only 2-3 grams of dirt, to the newer filters, some of which need to trap more than 40 grams of dirt. The size of these filters has caused problems due to the increased space they occupy, as well as the cost of the filter media.

Thus, there is a need to improve the removal of contaminants in a fuel system.

SUMMARY OF THE INVENTION

An object of the invention is to fulfill the need referred to above. In accordance with the principles of the present invention, this objective is achieved by providing a cyclonic separator separating contaminants from liquid fuel. The separator includes a body having a base portion and sidewall structure extending from the base portion. The base portion and sidewall structure define an internal volume. An inlet port in the body communicates with the internal volume, and an outlet port in the body also communicates with the internal volume. The sidewall structure is constructed and arranged to cause fuel, containing a mixture of liquid fuel and contaminants that enters the inlet port to move in a generally circular manner in the internal volume so that the contaminants separate from the liquid fuel, with the contaminants settling in the base portion and the liquid fuel moving through the outlet port.

In accordance with another aspect of the invention, a method of separating contaminants from liquid fuel in a vehicle fuel system provides a cyclonic separator in a fuel flow passage of a vehicle. Fuel in the fuel flow passage is directed into the cyclonic separator with the cyclonic separator separating contaminants from the liquid fuel.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Cyclonic particle separators are used in the process industry to separate different materials, whether it is solid-gas, liquid-gas, liquid-solid, or liquid-liquid. Most of these devices are sized for very large flow throughputs, and are not intended for the smaller flow rates that occur in an automotive fuel system. In addition, most of these devices are designed to handle a large number of different mediums flowing through them. Current automotive fuel systems have no similar device, but instead rely on paper filters to remove contaminants. Hence, there is a need for a cyclonic separator for a fuel system.

Figure 1:
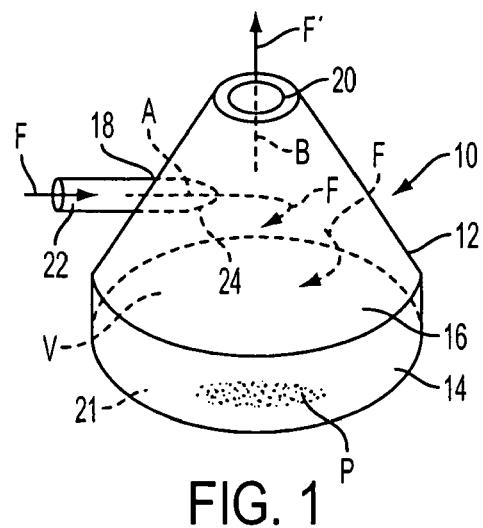
FIG. 1 is a side view of a cyclonic separator connected in a fuel flow passage in accordance with an embodiment of the invention.
Figure 2:
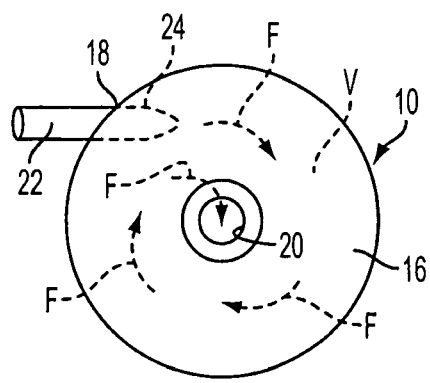
FIG. 2 is a plan view of the cyclonic separator of FIG. 1 in the fuel flow passage.

Thus, in accordance with an embodiment of the invention, a cyclonic separator, generally indicated at 10 in FIGS. 1 and 2, includes a body 12 having a generally circular base portion 14 and sidewall structure 16 extending from the base portion 14. In the embodiment, the sidewall structure 16 is generally in the shape of a truncated right circular cone. The base portion 14 and sidewall structure 16 define an internal volume V.

The body 12 includes an inlet port 18 and an outlet port 20, each communicating with the internal volume V. The inlet port 18 is fluidly connected with a fuel flow passage 22 of a vehicle fuel system. The inlet port 18 has an axis A that is oriented radially at a location generally in the middle of the conical sidewall structure 16. The truncated portion of the conical sidewall structure 16 defines the outlet port 20 having an axis B that is positioned such that the outlet port 20 opens upwardly. Thus, axis A is generally perpendicular with respect to axis B.

The base portion 14 of the body 12 defines a container space 21 for storing of the separated contaminant. Fuel F from the fuel flow passage 22 enters the body 12 through an inlet nozzle 24 that can be considered to be part of the passage 22 or part of the inlet 18. The fuel F moves through the internal volume V of the body 12 in a circular fashion at a high rate of speed due to the conical shape of the sidewall structure 16 of the body 12. Dirt or contaminant particles P in the fuel F that enters is spun and separates from the liquid fuel on the edge of the conical sidewall structure 16, and settles on the bottom of the base portion 14 of the body 12. Liquid fuel continues to swirl and excess fuel F' exits through the outlet port 20.

The cyclonic separator 10 can be positioned in several positions in the fuel supply passage 22 (between a fuel tank and an engine) in fuel system. For example, the separator 10 can be: at an inlet to a fuel reservoir, a part of a conventional jet pump system, at a pump inlet, inside the fuel pump cap, in the pump outlet fuel flow stream, or located prior to a small fuel filter. It is preferable that the separator 10 acts as a pre-filter for the primary fuel filter, allowing a significant decrease in the size of the filter. Alternatively, in using the separator 10, it may be possible to eliminate the conventional primary fuel filter, or possibly even eliminate the conventional pump strainer sock.

Figure 3:
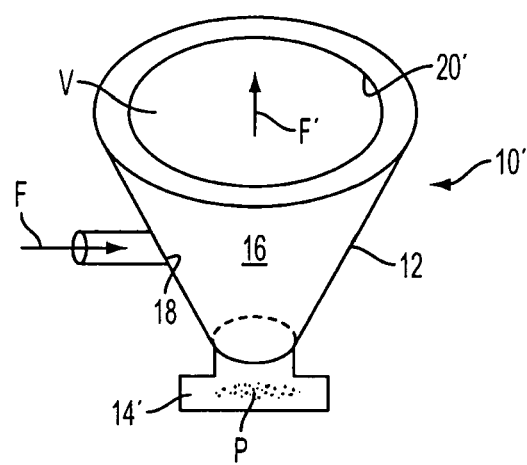
FIG. 3 is a side view of a cyclonic separator connected in a fuel flow passage in accordance with another embodiment of the invention.

With reference to FIG. 3, in another embodiment, the conical sidewall structure 16 can be inverted such contaminant particles P move through the truncated vertex into the base portion 14'. Liquid fuel swirls and excess fuel F' exits through the outlet port 20'. Thus, the outlet port 20' is at an end of the body 12 opposite the truncated vertex.

Thus, the separators 10, 10' offer several advantages, e.g., small size, low cost, no moving parts, and the potential to greatly reduce the size, or perhaps even eliminate the fuel filter in it's entirety.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A cyclonic separator for separating contaminants from liquid fuel in combination with a fuel flow passage of an automotive fuel system so that the cyclonic separator is disposed in the fluid flow passage between a fuel tank and an engine, the combination comprising:
   a cyclonic separator comprising:
      a body having a base portion and sidewall structure extending from the base portion, the base portion and sidewall structure defining an internal volume,
      an inlet port in the body communicating with the internal volume, and
      an outlet port in the body communicating with the internal volume,
   wherein the sidewall structure is constructed and arranged to cause fuel, containing a mixture of liquid fuel and contaminants, that enters the inlet port to move in a generally circular manner in the internal volume so that the contaminants separate from the liquid fuel, with the contaminants settling in the base portion and the liquid fuel moving through the outlet port, and
   a fuel flow passage of an automotive fuel system, the inlet port being in fluid communication with the fuel flow passage.

2. The combination of claim 1, wherein the sidewall structure is in the form of a generally truncated right circular cone, the outlet port being defined at a truncated portion of the conical sidewall structure.

3. The combination of claim 2, wherein the inlet port is provided in the conical sidewall structure and an axis of the inlet port is oriented generally perpendicular with respect to an axis of the outlet port.

4. The combination of claim 3, wherein the inlet port is disposed generally at a middle portion of the conical sidewall structure.

5. The combination of claim 1, wherein the sidewall structure is in the form of a generally truncated right circular cone, the outlet port being defined at an end of the sidewall structure opposite a truncated portion of the conical sidewall structure.

6. The combination of claim 1, further comprising a nozzle associated with the inlet port.

7. A The combination of claim 1, wherein each of the inlet port and the outlet port is provided in the sidewall structure.

8. A cyclonic separator for separating contaminants from liquid fuel in combination with a fuel flow passage of an automotive fuel system so that the cyclonic separator is disposed in the fluid flow passage between a fuel tank and an engine, the combination comprising:
   a cyclonic separator comprising:
      a body having a base portion and means, extending from the base portion, for causing separation of contaminants, the base portion and the means for causing separation defining an internal volume,
      an inlet port in the body communicating with the internal volume, and
      an outlet port in the body communicating with the internal volume,
   wherein the means for causing separation is constructed and arranged to cause fuel, containing a mixture of liquid fuel and contaminants, that enters the inlet port to move in a generally circular manner in the internal volume so that the contaminants separate from the liquid fuel, with the contaminants settling in the base portion and the liquid fuel moving through the outlet port, and
   a fuel flow passage of an automotive fuel system the inlet port being in fluid communication with the fuel flow passage.

9. The combination of claim 8, wherein the means for causing separation is wall structure is in the form of a generally truncated right circular cone, the outlet port being defined at a truncated portion of the conical wall structure.

10. The combination of claim 9, wherein the inlet port is provided in the conical wall structure and an axis of the inlet port is oriented generally perpendicular with respect to an axis of the outlet port.

11. The combination of claim 10, wherein the inlet port is disposed generally at a middle portion of the conical wall structure.

12. The combination of claim 8, wherein the means for causing separation is wall structure is in the form of a generally truncated right circular cone, the outlet port being defined at and end of the wall structure opposite a truncated portion of the conical wall structure.

13. The combination of claim 8, further comprising a nozzle associated with the inlet port.

14. A method of separating contaminants from liquid fuel in an automotive fuel system, the method including:
   providing a cyclonic separator in a fuel flow passage of an automotive fuel system so that the cyclonic separator is disposed between a fuel tank and an engine, and
   directing fuel in the fuel flow passage into the cyclonic separator with the cyclonic separator separating contaminants from the liquid fuel.

15. The method of claim 14, wherein the step of providing the cyclonic separator provides the cyclonic separator to include:
   a body having a base portion and sidewall structure extending from the base portion, the base portion and sidewall structure defining an internal volume,
   an inlet port in the body communicating with the internal volume, and
   an outlet port in the body communicating with the internal volume, and
   wherein the step of directing fuel includes directing fuel through the inlet port into the internal volume such that the sidewall structure causes the fuel to move in a generally circular manner in the internal volume so that the contaminants separate from the liquid fuel, with the contaminants settling in the base portion and the liquid fuel moving through the outlet port.

16. The method of claim 15, wherein the step of providing the cyclonic separator provides the sidewall structure in the form of a generally truncated right circular cone.

17. The method of claim 16, wherein the outlet port is defined at a truncated portion of the conical sidewall structure.

18. The method of claim 16, wherein the outlet port is disposed opposite a truncated portion of the conical sidewall structure.

19. The method of claim 16, wherein the inlet port is provided in the conical sidewall structure and an axis of the inlet port is oriented generally perpendicular with respect to an axis of the outlet port.

20. The method of claim 14, wherein the step of directing fuel includes directing fuel through a nozzle at the inlet port.

* * * * *